(12) United States Patent
Marcucci et al.

(10) Patent No.: US 8,515,946 B2
(45) Date of Patent: Aug. 20, 2013

(54) LOCATION DESCRIPTION FOR FEDERATION AND DISCOVERABILITY

(75) Inventors: Paolo Marcucci, Seattle, WA (US); Carlos Brito, Sammamish, WA (US); Chris McConnell, Redmond, WA (US); Evgeny Tvorun, Woodinville, WA (US); Scott Hysom, Issaquah, WA (US); Tyler Beam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 700 days.

(21) Appl. No.: 12/039,446

(22) Filed: Feb. 28, 2008

(65) Prior Publication Data

US 2009/0222411 A1   Sep. 3, 2009

(51) Int. Cl.
*G06F 17/30*   (2006.01)
*G06F 11/14*   (2006.01)

(52) U.S. Cl.
CPC .... *G06F 17/30067* (2013.01); *G06F 17/30864* (2013.01); *G06F 11/1464* (2013.01); *G06F 17/30017* (2013.01); *G06F 17/30038* (2013.01)
USPC .......................................... 707/716; 707/770

(58) Field of Classification Search
USPC ................................................ 707/716, 770
See application file for complete search history.

(56) References Cited

U.S. PATENT DOCUMENTS

| | | | |
|---|---|---|---|
| 6,356,902 B1 | 3/2002 | Tan et al. | |
| 6,947,925 B2 | 9/2005 | Newcombe et al. | |
| 6,970,869 B1 | 11/2005 | Slaughter | |
| 6,996,587 B2 | 2/2006 | Wagener et al. | |
| 7,096,224 B2 * | 8/2006 | Murthy et al. | 707/763 |
| 7,130,862 B2 | 10/2006 | Easton | |
| 7,177,862 B2 * | 2/2007 | Zhang et al. | 707/722 |
| 7,181,463 B2 | 2/2007 | Moore | |
| 7,188,114 B2 | 3/2007 | Liu | |
| 7,797,340 B2 * | 9/2010 | Cheng et al. | 707/781 |
| 2003/0187841 A1 * | 10/2003 | Zhang et al. | 707/4 |
| 2004/0083242 A1 | 4/2004 | Ye | |
| 2005/0080768 A1 | 4/2005 | Zhang | |
| 2005/0091235 A1 * | 4/2005 | Moore et al. | 707/100 |
| 2005/0204014 A1 * | 9/2005 | Yao et al. | 709/217 |
| 2006/0161554 A1 | 7/2006 | Lucovsky | |
| 2007/0143664 A1 | 6/2007 | Fang | |
| 2007/0220170 A1 | 9/2007 | Abjanic | |

OTHER PUBLICATIONS

R. Akkiraju, J. Farrell, J.A. Miller, M. Nagarajan, A. Sheth and K. Verma, "Web Service Semantics—WSDL-S," IBM Research Report, Jan. 27, 2006, 6 pp. http://domino.research.ibm.com/library/cyberdig.nsf/papers/EF9FE52551FB21DC8525710D005A8480/$File/rc23854.pdf.

Pijanowski, Keith, "Enrich Your XML Serialization with Schema Providers in the .NET Framework," MSDN Magazine, Jun. 2006, 7 pp. http://msdn.microsoft.com/msdnmag/issues/06/06/ClassToContract/default.aspx.

Champion, Michael, Ferris, Chris, Newcomer, Eric and Orchard, David, "Web Services Architecture," W3C, Oct. 20, 2002, 25 pp. http://dev.w3.org/cvsweb/2002/ws/arch/wsa/wd-wsa-arch.html?rev=1.10.

Malan, David, "Summary Structures for XML", Computer Science Group, Harvard University, Cambridge, MA, 2004, 6 pp.

International Search Report and Written Opinion, mailed Apr. 29, 2009.

* cited by examiner

*Primary Examiner* — Cheyne Ly
(74) *Attorney, Agent, or Firm* — Shook Hardy & Bacon LLP

(57) ABSTRACT

System and methods for directing a federated search using a location description file to locate a data source are provided. For a federated search, a location description may be used to describe the location of each data source searched, and may further be used to connect the user to that particular data source. The format of such a location description file may include several elements, some of which provide information on how to display the file (e.g., name, description, author, icon link, etc.) and other elements (e.g., simple location, location type, etc.) are used to connect the user to the location of the data source.

14 Claims, 6 Drawing Sheets

LOCATION DESCRIPTION FOR FEDERATION AND DISCOVERABILITY

BACKGROUND

To achieve a more efficient and thorough search, a federated search may be performed, where one or more data sources are searched at once. Then, with only one search, a user can receive results from various sources in various formats.

SUMMARY

For a federated search, a location description may be used to describe the location of each data source searched, and may further be used to connect the user to that particular data source. The format of such a location description file may include several elements, some of which provide information on how to display the file (e.g., name, description, author, icon link, etc.) and other elements (e.g., simple location, location type, etc.) are used to connect the user to the location of the data source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Figure 1:
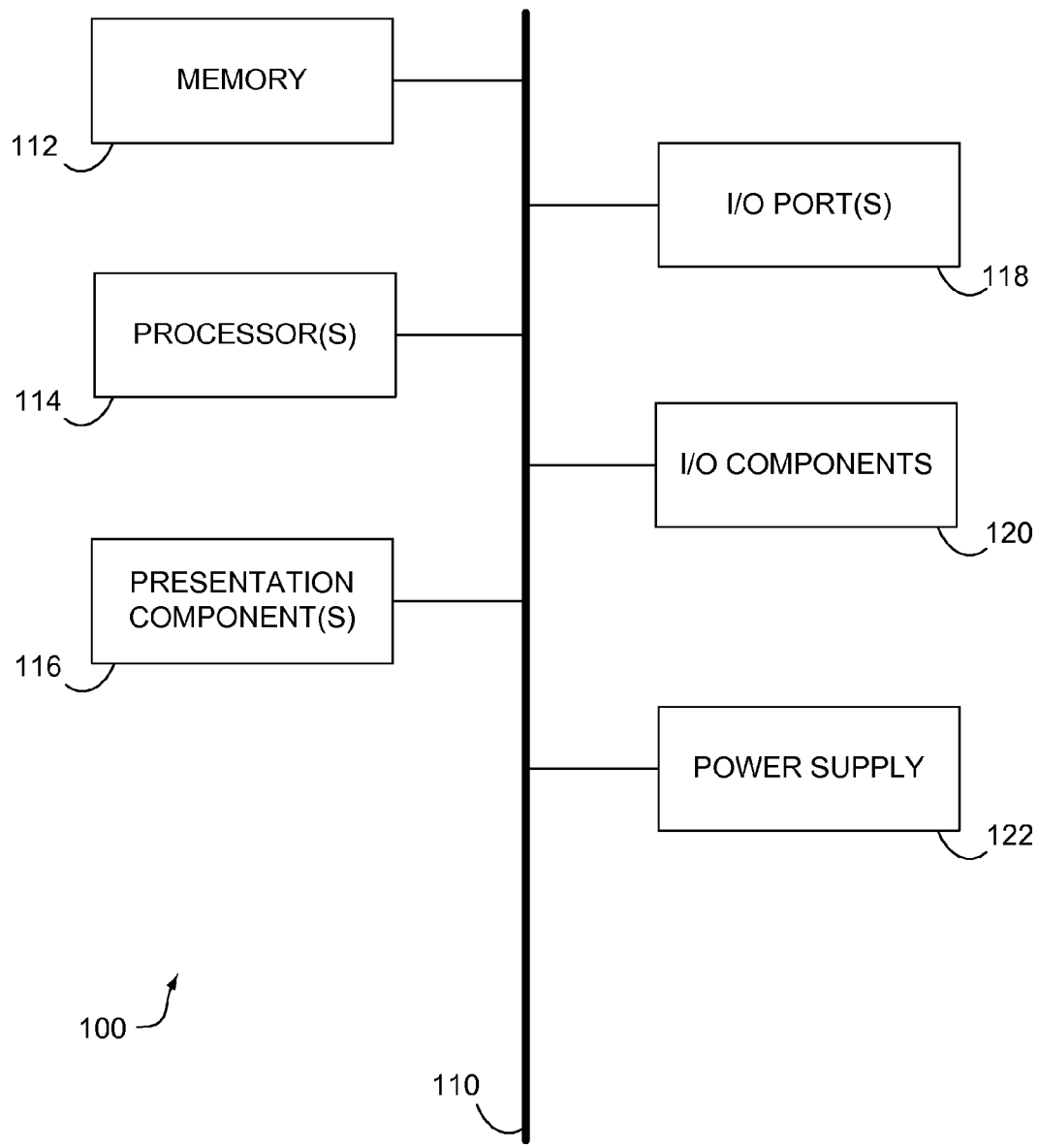
FIG. 1 is a block diagram of a computing system environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A federated search is a simultaneous search of multiple data sources. To execute such a search, each data source may have a location description file, describing the location of the data source. Once a location has been described for a data source in a location description file, a user may be connected to the data source, and the user's search may then include that particular data source. The format of such a location description file may include several elements, some of which provide information on how to display the file (e.g., name, description, author, icon link, etc.) and other elements (e.g., simple location, location type, etc.) are used to connect the user to the location of the data source.

In accordance with an embodiment of the present invention, one or more computer storage media having a data structure for storing data representing a location description file of a data source is provided. The data structure comprises a first data field containing data representing a simple location element of one or more data sources; a second data field containing data representing a location type element of the data sources; and a third data field derived from the first and second data fields representing a location description file of the data source.

In another embodiment of the present invention, a method of directing a search to a data source is provided. The method comprises, in part, receiving a location of a data source in a location description format, where the location description format includes a simple location element and a location type element; storing the location in a location description file; and accessing the location from the location description file.

In yet another embodiment in accordance with the present invention, one or more computer storage media for performing a method of performing a federated search of one or more data sources in response to a search query. The method comprises, in part, receiving a search query; locating the data sources using a location description file, where each data source is associated with a location description file; accessing the data sources; searching the data sources using the search query; and providing the results for presentation.

Having briefly described an overview of embodiments of the present invention, an exemplary operating environment suitable for use in implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the illustrated computing environment be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including hand-held devices, consumer electronics, general-purpose computers, specialty-computing devices, and the like. Embodiments of the present invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disk drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game advertisement, satellite dish, scanner, printer, wireless device, and the like.

Figure 2:
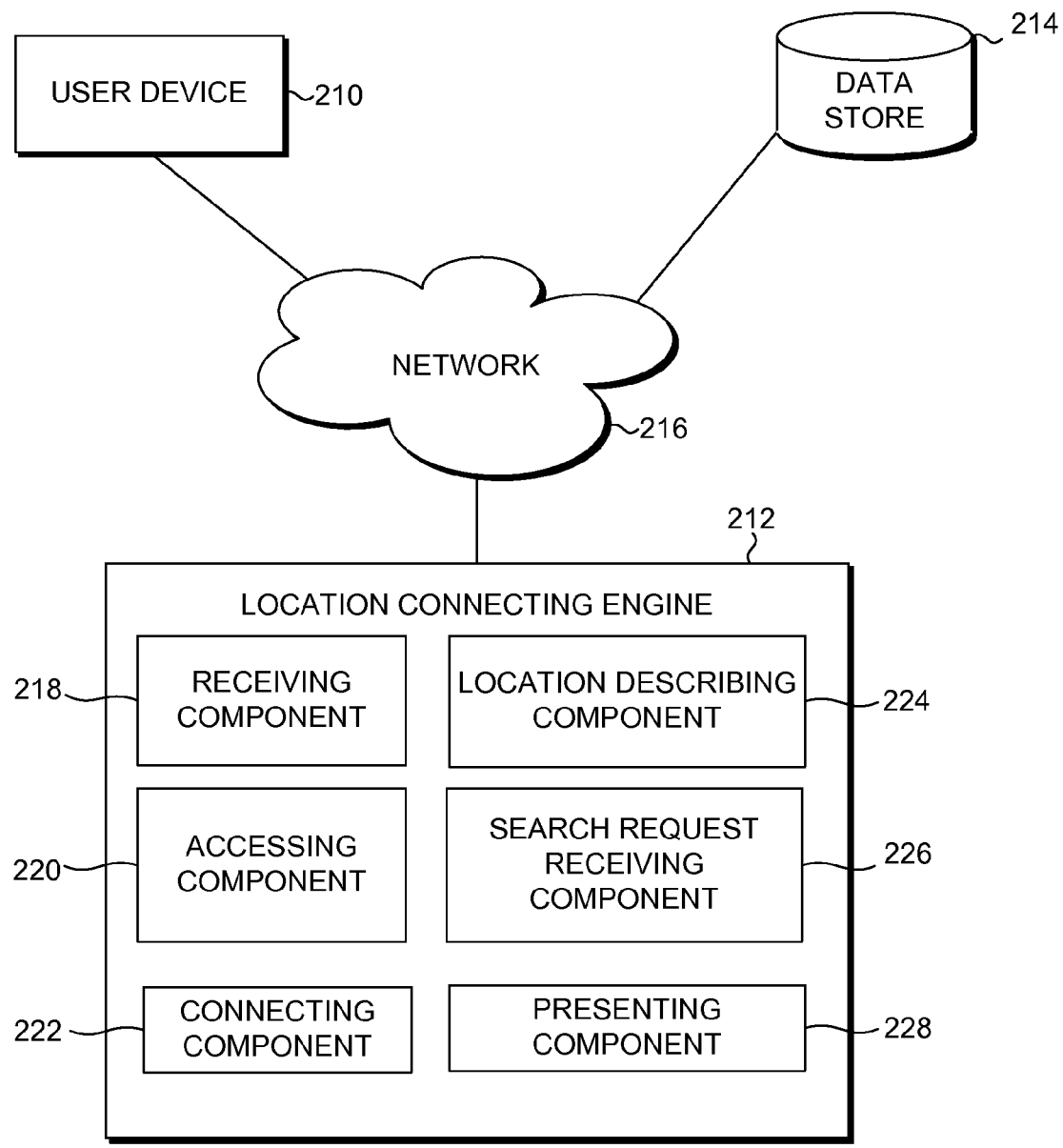
FIG. 2 is a block diagram illustrating an overview of a system in accordance with an embodiment of the invention.

Turning now to FIG. 2, a block diagram is illustrated that shows an exemplary computing system 200 configured to perform searches from various data sources, in accordance with an embodiment of the present invention. It will be understood and appreciated by those of ordinary skill in the art that the computing system 200 shown in FIG. 2 is merely an example of one suitable computing environment and is not intended to suggest any limitation as to the scope of use or functionality of the present invention. Neither should the computing system 200 be interpreted as having any dependency or requirement related to any single component/module or combination of components/modules illustrated therein.

Computing system 200 includes a location connecting engine 212, a user device 210, and a data store 214 all in communication with one another via a network 216. The network 216 may include, without limitation, one or more local area networks (LANs) and/or wide area networks (WANs). Such networking environments are commonplace in offices, enterprise-wide computer networks, intranets, and the Internet. Accordingly, the network 216 is not further described herein.

The data store 214 may be configured to store information associated with various types of content, as more fully described below. It will be understood and appreciated by those of ordinary skill in the art that the information stored in the data store 214 may be configurable and may include any information relevant to online content. Further, though illustrated as a single, independent component, data store 214 may, in fact, be a plurality of data stores, for instance, a database cluster, portions of which may reside on a computing device associated with the location connecting engine 212, the user device 210, another external computing device (not shown), and/or any combination thereof.

Each of the location connecting engine 212 and the user device 210 shown in FIG. 2 may be any type of computing device, such as, for example, computing device 100 described above with reference to FIG. 1. By way of example only and not limitation, the location connecting engine 212 and/or the user device 210 may be a personal computer, desktop computer, laptop computer, handheld device, mobile handset, consumer electronic device, and the like. It should be noted, however, that the present invention is not limited to implementation on such computing devices, but may be implemented on any of a variety of different types of computing devices within the scope of the embodiments hereof.

As shown in FIG. 2, the location connecting engine 212 includes a receiving component 218, an accessing component 220, a connecting component 222, a location describing component 224, a search request receiving component 226, and a presenting component 228. In some embodiments, one or more of the illustrated components 218, 220, 222, 224, 226, and 228 may be implemented as stand-alone applications. In other embodiments, one or more of the illustrated components 218, 220, 222, 224, 226, and 228 may be integrated directly into the operating system of the location connecting engine 212 or the user device 210. In the instance of multiple servers, embodiments of the present invention contemplate providing a load balancer to federate incoming queries to the servers. It will be understood by those of ordinary skill in the art that the components 218, 220, 222, 224, 226, and 228 illustrated in FIG. 2 are exemplary in nature and in number and should not be construed as limiting. Any number of components may be employed to achieve the desired functionality within the scope of the embodiments of the present invention.

The receiving component 218 is configured for receiving content associated with data sources. A data source may be any source, such as a database, with a collection of stored records or data. An exemplary data source includes a document library. More specifically, the received content is associated with the location of the data source. Once received by the receiving component 218, the content may be stored, for instance, in association with data store 214, such that it is searchable to determine satisfaction of a user query, as more fully described below. Such received content may additionally be indexed, if desired.

The location describing component 224 is configured for describing the location of one or more data sources as a location description file. In one embodiment, the location describing component includes a plurality of elements configured for providing a location description file. Such a format may include various elements to describe the location and to provide a location link to the data source. One such embodiment is described more fully below with reference to FIGS. 3 and 4.

The accessing component 220 is configured for accessing the data sources located by the location connecting engine 212. More specifically, the data sources may be accessed in order to search the data sources based on a user's query. As will be described further below, the accessing component 220 accesses the data source after the data source has been located, and may access one or more data sources.

The connecting component 222 is configured for connecting a search to a data source, where the location of the data source has been described by location description component 224. One skilled in the art will appreciate that there are various ways of utilizing connecting component 222. For example, if a user has a data source such as a document library that they wish to be searched, the connecting component 222 may connect the user to the library by presenting a special hyperlink pointing to the location description file describing the library. This file may then be downloaded to the user's device (e.g., user device 210), where it may be added to the user's locations of data sources that are to be searched. In another embodiment, the user may receive a location description file as an attachment in an email, and after downloading may be added to the user's locations. One skilled in the art will appreciate that this self-contained nature of the location description file allows such a file to be shared easily (e.g., via emails or URLs).

The search request receiving component 226 is configured for receiving a search request for which satisfying content is desired. By way of example, the search request may be received at a user interface as the result of user input. It will be understood and appreciated by those of ordinary skill in the art that multiple methods exist by which a user may input a search request. For instance, search requests may be input, by way of example only, utilizing a keyboard, joystick, trackball, touch-advertisement, or the like. Alternative user interfaces known in the software industry are contemplated by the invention. The search request is typically a user-initiated action or response that is received at a user interface, as discussed above. Examples of a request are a click, click-through, or selection by a user, e.g., human user or robotic user; however, it is understood and appreciated by one of ordinary skill in the art that a request may take any number of forms of indication at a web page. Further, it is contemplated by the present invention that a robotic user may be any non-human operator (i.e., an internet bot, web bot program, virus, robot, web crawler, web spidering program, or any software applications that run automated tasks over the Internet), which is an artificial agent that, by its actions, conveys a sense that it has intent or agency of its own. Even further, a human user is contemplated as being a human, but also, an entity (virtual or physical) acting under the present intent of a human operator.

The presenting component 228 is configured for presenting at least one of search results and information relating to the location description files of the data sources. Typically such presentation will be by way of display in association with a user interface. However, other forms of presentation, including audio presentation and audio/video presentation, are contemplated to be within the scope of embodiments hereof.

Figure 3:
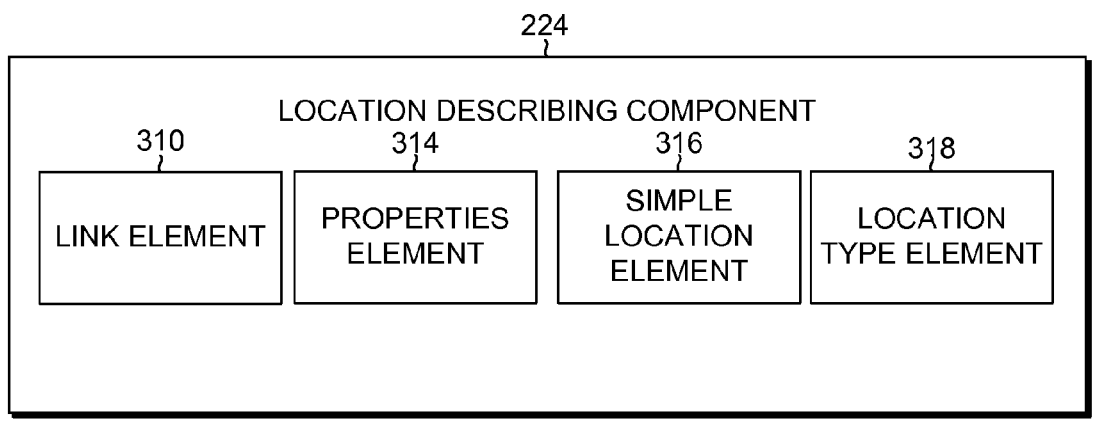
FIG. 3 is a block diagram illustrating a location describing component in accordance with an embodiment of the invention.

Turning now to FIG. 3, one embodiment of the location describing component 224 is described in further detail. As illustrated, the location describing component 224 includes a link element 310, a properties element 314, a simple location element 316, and a location type element 318. It will be understood by those of ordinary skill in the art that the components 310, 314, 316, and 318 illustrated in FIG. 3 are exemplary in nature and in number and should not be construed as limiting. Any number of elements may be employed to achieve the desired functionality within the scope of embodiments hereof.

It will be appreciated that the location describing components 310, 314, 316, and 318 comprise elements, such as XML elements, where the location describing component 224 is the root element. Besides the elements set forth in FIG. 3, the location describing component 224 may optionally include other elements (not shown), such as a name element, a description element, an author element, a properties element, a scope element, a condition list element, and the like. For example, a name element may be used to display the name of the location, and a description element may include a description for the location. An author element may be used to display the author or owner of the location description file. In general, these elements provide a way to display the location description file or information related to the location description file. By way of example only, a scope element may be used to provide information related to the scope of the data source that is associated with the location description file. For example, the scope element may provide exclusions to the search, such as subfolders of the data source.

The link element 310 is a shell link type element pointing to an icon (e.g., in icon image file format) representing the location description file (or a template for creating the location description file).

One skilled in the art will appreciate that the various elements included in the location describing component 224 may include one or more shell links. A shell link is a data object that contains information used to access another object. The types of objects that can be accessed through shell links include files, folders, disk drives, printers, etc. A shell link allows a user or an application to access an object from anywhere in the namespace, even if the user or application does not know the current name and location of the object.

The properties element 314, as used by the location describing component 224, is configured for storing properties of the location description file. One skilled in the art will appreciate that, in some embodiments, a user or an application can add arbitrary metadata relevant to the location (e.g., ratings, comments, etc.) in the properties element 314.

The simple location element 316 is configured to provide the location of a data source, and may be used by the location description file when referring to data or content on a file system to serialize the information that is needed. More specifically, the simple location element 316 may be present in two forms: URL and serialized. By way of example, without limitation, a URL form of the simple location element 316 may include the absolute path to the location, and the serialized form will contain other various links or paths to the location (e.g., relative paths, content IDs, etc.), such that if one path fails the data object or file can still be reached. For example, the absolute path may first be used to locate the data object or file. If this path does not work, the relative path is used to locate the object or file, and so on, until the object or file is located. Such a mechanism allows for adaptability if the location is, for example, lost or has moved, and then the location description file can still find the location.

Figure 4:
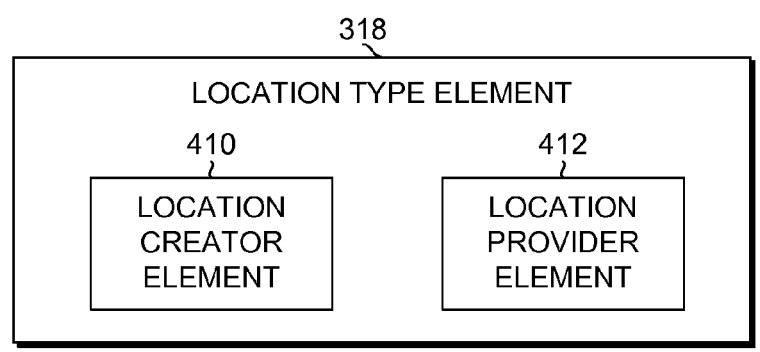
FIG. 4 is a block diagram illustrating a location type element in accordance with an embodiment of the invention.

A location type element 318 is configured to provide the location type of the location description file. With reference to FIG. 4, a block diagram illustrating an embodiment of the location type element 318 is shown. The illustrated location type element 318 includes a location creator element 410 and a location provider element 412.

Typically, either the location creator element 410 or the location provider element 412 is used to define the location type element 318. More specifically, the location creator element 410 assists a user in creating a location description file, for example, by utilizing a user interface presented to the user (e.g., an add location wizard user interface). In some embodiments, the location description file may be created using a template when the location description is only partially populated. A template might be used during the initial set-up and/or during the installation of additional connectors.

In embodiments of the invention, the location creator element 410 includes a wizard start page link element and, optionally, a properties element and a wizard help page link element. A wizard start page link element, as referred to herein, is configured to link the user to the add location wizard start page. The properties element may contain any necessary properties determined by the user. Further, the location creator element 410 may include a wizard help page link element configured to provide support to the user when using the wizard start page link element.

The location provider element 412 is used when the location description is generated by the provider (i.e., from the server side). In some embodiments, the location provider element 412 includes a location link element and, optionally, a schema link element and a properties element. A location link element may provide the location information needed to make the connection to the desired location. Additionally, a schema link element provides a link to the related schema of the data source. Having this element for locations makes the location description file verifiable, so existing XML schema validation tools can be used at build time to ensure the correctness and validity before deployment. As another optional element within the location provider element, a properties element may be used to store generic property information regarding the provider, similar to the property element described for the location creator element above. One skilled in the art will understand and appreciate that such a property element may contain any amount of properties as determined by the provider.

Figure 5:
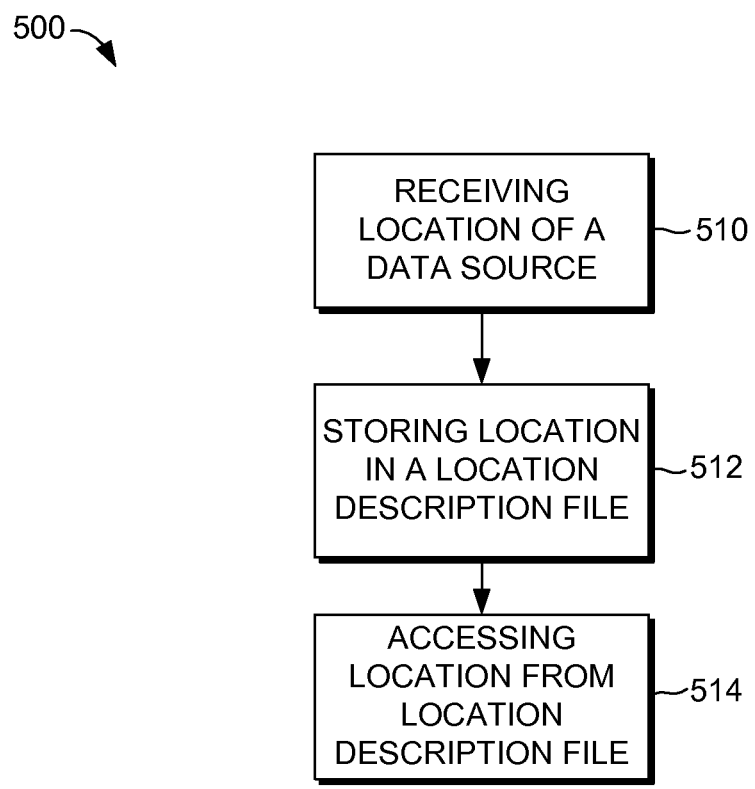
FIG. 5 is a flow diagram illustrating a method for directing a search to a data source, in accordance with an embodiment of the invention.

Turning now to FIG. 5, an exemplary method 500 for directing a search to a data source is illustrated. Initially, as indicated in block 510, the location of a data source is received. The location may be received, for example, from the location provider element 412, where the location has been provided or generated by connectors or server side applications, as discussed above with respect to FIG. 4. Alternatively, the location may be received from the location creator element 410, where, for example, the user has provided the location with the assistance of an add location wizard, as described above.

Next, as indicated at block 512, the received location is stored in a location description file. As described earlier with respect to FIG. 3, the location or path to the data source may be provided as a simple location element (e.g., simple location element 316 in FIG. 3). The location type element, such as location type element 318, will depend upon where the location was received as discussed above. Creating the location description file describing the location of a data source allows the location to be self-contained, so it can be shared with other users. Additionally, the location description file is human readable. That is, the file can be edited easily by independent software vendors or search providers without the need for special tools.

Once the location description file is created in the proper format, the data source can be accessed, as indicated in block 514. After accessing the location, the user can be connected to the data source (e.g., by utilizing the connecting component 222 in FIG. 2).

Figure 6:
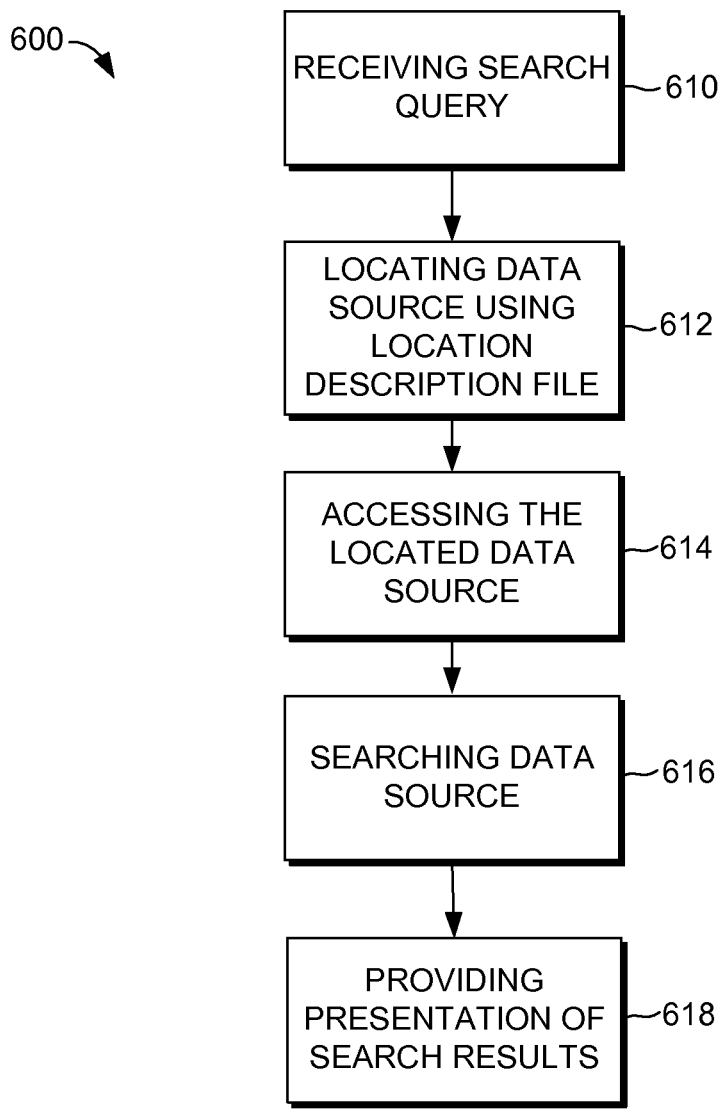
FIG. 6 is a flow diagram illustrating a method in accordance with an embodiment of the invention.

Turning now to FIG. 6, an exemplary method 600 for performing a federated search of a data source is illustrated. Initially, as indicated in block 610, a search query is received, for example, by utilizing the search request receiving component 226 in FIG. 2. The user may designate which data sources are to be searched for the search query, and thus at block 612, these data sources are located using their location description files (e.g., by utilizing the location describing component 224 in FIG. 2). Once these data sources have been located, the user connects to the data sources to access the data source for the search (e.g., by utilizing the accessing component 220 and the connecting component 222 in FIG. 2). This is indicated in block 614. Finally, at block 616, the particular data sources are searched using the search query provided in block 610 to produce search results. These search results are then provided for presentation to the user at block 618.

Figure 7:
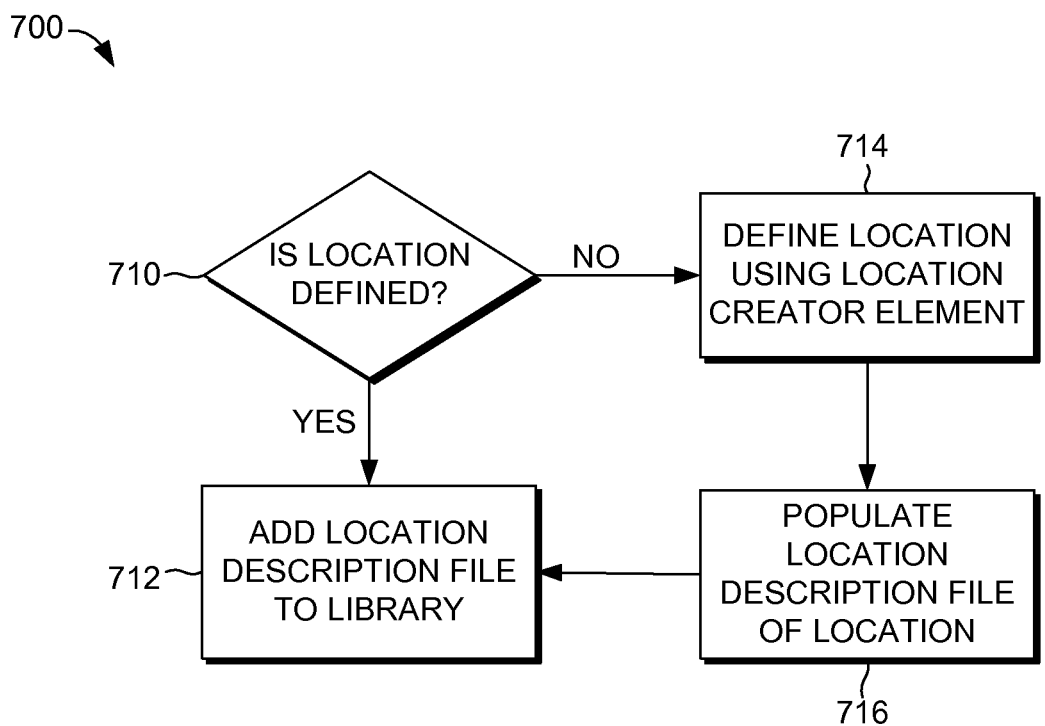
FIG. 7 is a flow diagram illustrating a method for generating a location description file for a data source, in accordance with an embodiment of the invention.

Turning now to FIG. 7, an exemplary method 700 for generating a location description file for the location of a data source is illustrated. Initially, as indicated in block 710, a determination is made over whether the location of the data source has been defined. The location of a data source has been defined if a location description file in the proper format exists. If so, the location description file is added to the library, as indicated in block 712. If the location has not been defined, the user may use the location creator element to define the location. In some embodiments, a location description file will be created by using a template that is partially populated with the necessary elements. The user may then be guided with the help of an Add Location wizard to finish populating the template to create a location description file defining the location of the data source. This is indicated at block 716. After the location description file defining the location has been populated, the location description file may be added to the library at block 712. In this way, the location description files are retained and may be used in federated searches to locate the desired data source that the user wishes to search.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computerized method carried out by a server having at least one processor for directing a search to a data source, the method comprising:

receiving a location of a data source comprising a searchable collection of stored records or data in a location description format, the location description format including a simple location element and a location type element, the simple location element comprising a serialized element indicating the location of the data source, the serialized element comprising relative paths to the location of the data source;

storing the location of the data source in a location description file that comprises a data structure and that is employed in a federated search to connect a search to the data source using the location stored in the data structure, wherein the location description file comprises:
- (1) a first data field containing data representing the simple location element of the data source,
- (2) a second data field containing data representing the location type element of the data source, and
- (3) a third data field containing a schema link element that provides a link to schema associated with the data source;

receiving a designation, entered by a user, designating the data source for searching;

receiving a request to access the data source;

verifying, using the at least one processor, correctness and validity of the location description file at build time bases on the schema link element; and accessing the data source based on the simple location element stored in the location description file.

2. The method of claim 1, wherein the location description format is created using a location description template.

3. The method of claim 1, wherein the location type element includes a location creator element and a location provider element.

4. The method of claim 1, wherein the location description file includes a link element.

5. The method of claim 1, wherein the location description file includes one or more elements in a shell link format.

6. The method of claim 1, wherein the location description file includes a properties element.

7. The method of claim 1, wherein the location description file is created using a location description template.

8. The method of claim 1, further comprising adding the location description file to a library.

9. One or more computer storage memory devices with computer-executable instructions embodied thereon for performing a method of performing a federated search of one or more data sources in response to a search query, the method comprising:

receiving a search query;

locating one or more data sources comprising searchable collections of stored records or data using location information stored in a location description file, wherein each data source has a location description file comprising:
- (1) a schema link to schema associated with the each data source
- (2) a location type element, and
- (3) a serialized element indicating the location of the each data source, the serialized element comprising relative paths to the location of the each data source;

using the schema link to validate the location description file;

utilizing the serialized element stored in the location description file associated with each of the one or more data sources to access the one or more data sources when performing a federated search;

searching the one or more data sources to produce search results; and providing a presentation of the search results.

10. The one or more computer storage memory devices of claim 9, wherein the location type element includes a location creator element and a location provider element.

11. The one or more computer storage memory devices of claim 9, wherein the location description file includes a link element.

12. The one or more computer storage memory devices of claim 9, wherein the location description file includes one or more elements in a shell link format.

13. The one or more computer storage memory devices of claim 9, wherein the location description file includes a properties element.

14. The one or more computer storage memory devices of claim 9, wherein the location description file is generated using a location description template.

* * * * *